United States Patent
Fujita

(10) Patent No.: US 10,768,416 B2
(45) Date of Patent: Sep. 8, 2020

(54) PROJECTION TYPE DISPLAY DEVICE, PROJECTION DISPLAY METHOD, AND PROJECTION DISPLAY PROGRAM

(71) Applicant: FUJIFILM Corporation, Tokyo (JP)

(72) Inventor: Koudai Fujita, Saitama (JP)

(73) Assignee: FUJIFILM Corporation, Tokyo (JP)

(*) Notice: Subject to any disclaimer, the term of this patent is extended or adjusted under 35 U.S.C. 154(b) by 156 days.

(21) Appl. No.: 15/886,841

(22) Filed: Feb. 2, 2018

(65) Prior Publication Data

US 2018/0157035 A1    Jun. 7, 2018

Related U.S. Application Data

(63) Continuation of application No. PCT/JP2016/069398, filed on Jun. 30, 2016.

(30) Foreign Application Priority Data

Aug. 26, 2015    (JP) ................. 2015-167018

(51) Int. Cl.
*G02B 27/14*    (2006.01)
*G09G 5/00*    (2006.01)
(Continued)

(52) U.S. Cl.
CPC .............. *G02B 27/01* (2013.01); *B60K 35/00* (2013.01); *G02B 27/0938* (2013.01);
(Continued)

(58) Field of Classification Search
CPC ............... G02B 27/01; G02B 27/0938; G02B 2027/014; G02B 2027/0181; G06K 9/00671; G03B 21/005
(Continued)

(56) References Cited

U.S. PATENT DOCUMENTS

| 6,750,832 B1 | 6/2004 | Kleinschmidt |
| 2011/0187844 A1 | 8/2011 | Ogawa et al. |
| 2015/0102995 A1* | 4/2015 | Shen ................. G06F 3/013 345/156 |

FOREIGN PATENT DOCUMENTS

| DE | 10334720 | 3/2005 |
| DE | 102012014447 | 1/2014 |

(Continued)

OTHER PUBLICATIONS

"Office Action of Germany Counterpart Application," dated Oct. 11, 2018, with English translation thereof, p. 1-p. 16.
(Continued)

*Primary Examiner* — William Choi
(74) *Attorney, Agent, or Firm* — JCIPRNET

(57) ABSTRACT

An HUD includes a projection unit that projects image light that is spatially modulated on the basis of image data onto a windshield, a sight line detection unit that detects a line of sight of a driver of a vehicle, and a system controller that acquires measurement data on shape of a region including a point that intersects the line of sight of the driver in a projectable range of the image light in the windshield, generates correction data for correcting distortion of an image based on the image light projected onto the region on the basis of the acquired measurement data and the direction of the line of sight of the driver, and corrects the image data using the generated correction data.

20 Claims, 12 Drawing Sheets

(51) Int. Cl.
  *G02B 27/01* (2006.01)
  *G09G 5/38* (2006.01)
  *B60K 35/00* (2006.01)
  *G09G 3/00* (2006.01)
  *H04N 9/31* (2006.01)
  *G06K 9/00* (2006.01)
  *G02B 27/09* (2006.01)
  *G03B 21/00* (2006.01)

(52) U.S. Cl.
  CPC ......... *G06K 9/00671* (2013.01); *G09G 3/001* (2013.01); *G09G 5/38* (2013.01); *H04N 9/3147* (2013.01); *H04N 9/3185* (2013.01); *H04N 9/3194* (2013.01); *B60K 2370/12* (2019.05); *B60K 2370/149* (2019.05); *B60K 2370/15* (2019.05); *B60K 2370/1529* (2019.05); *B60K 2370/334* (2019.05); *B60K 2370/785* (2019.05); *G02B 2027/014* (2013.01); *G02B 2027/0181* (2013.01); *G03B 21/005* (2013.01); *G09G 2320/0693* (2013.01); *G09G 2354/00* (2013.01); *G09G 2380/10* (2013.01)

(58) Field of Classification Search
  USPC .......................................... 359/630; 345/7, 9
  See application file for complete search history.

(56) References Cited

FOREIGN PATENT DOCUMENTS

| | | |
|---|---|---|
| JP | 2010-125910 | 6/2010 |
| JP | 2014-199385 | 10/2014 |
| JP | 2015-087594 | 5/2015 |

OTHER PUBLICATIONS

"International Search Report (Form PCT/ISA/210) of PCT/JP2016/069398", dated Aug. 9, 2016, with English translation thereof, pp. 1-2.

"Written Opinion (Form PCT/ISA/237)", dated Aug. 9, 2016, with English translation thereof, pp. 1-8.

\* cited by examiner

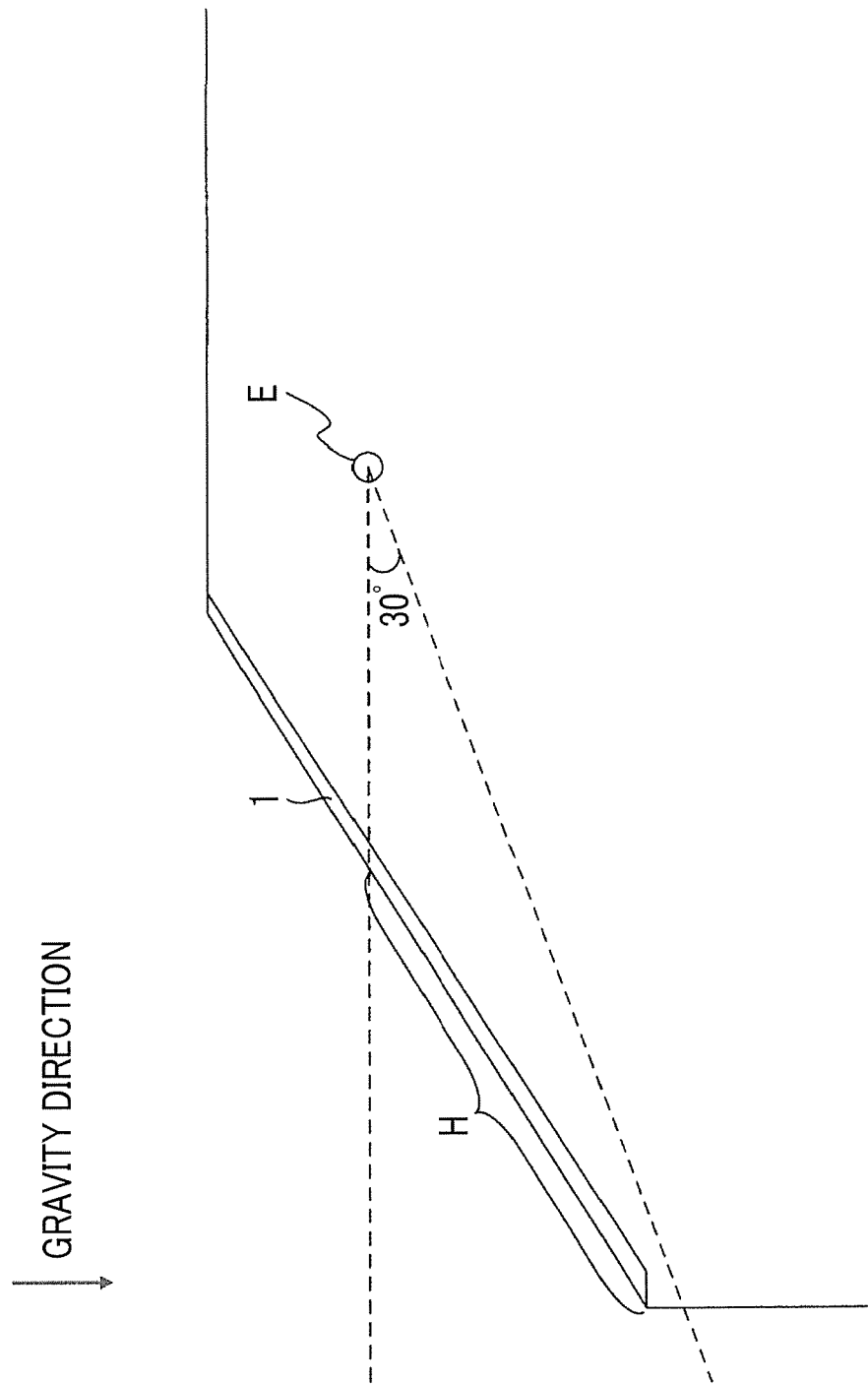

PROJECTION TYPE DISPLAY DEVICE, PROJECTION DISPLAY METHOD, AND PROJECTION DISPLAY PROGRAM

CROSS-REFERENCE TO RELATED APPLICATIONS

This application is a Continuation of PCT International Application No. PCT/JP2016/069398 filed on Jun. 30, 2016, which claims priority under 35 U.S.C § 119(a) to Japanese Patent Application No. 2015-167018 filed on Aug. 26, 2015. Each of the above application(s) is hereby expressly incorporated by reference, in its entirety, into the present application.

BACKGROUND OF THE INVENTION

1. Field of the Invention

The present invention relates to a projection type display device, a projection display method, and a non-transitory computer readable recording medium storing a projection display program.

2. Description of the Related Art

A head-up display (HUD) for a vehicle that uses a windshield of a vehicle such as an automobile, a train, a heavy machine, a construction machine, an aircraft, a ship, or an agricultural machine as a screen and projects image light onto the screen to cause a driver to visually recognize a virtual image based on the image light is known (see JP2015-87594A and JP2014-199385A).

JP2015-87594A discloses an HUD that is capable of presenting a virtual image without distortion in a case where the virtual image is seen in every direction by optimizing a projection optical system in accordance with the shape of a windshield of a vehicle.

JP2014-199385A discloses an HUD that is capable of presenting a virtual image without distortion when seen in every direction by storing a distortion correction parameter for each viewpoint position of a driver, and correcting image data that is a source of image light to be projected using a distortion correction parameter corresponding to a viewpoint position of the driver detected through image analysis.

SUMMARY OF THE INVENTION

A windshield of a vehicle has been designed in preferential consideration of design or the like compared with an optical characteristic. For this reason, even in vehicles of the same model, variation easily occurs in the shapes of the windshields.

In the HUD disclosed in JP2015-87594A, in any vehicle, in order to reduce distortion of a virtual image, it is necessary to adjust a projection optical system so that the distortion of the virtual image becomes small for each vehicle.

Since types of vehicles increase without limit, in such a method, persons for adjustment operations necessarily increase, and the number of components of the optical system increases, so that management of the components is greatly changed. Thus, the manufacturing cost of the HUD and a vehicle on which the HUD is mounted increases. Further, in a case where a projection range of image light becomes large and a visual recognition range of the virtual image becomes large, it is difficult to correct the distortion using only the optical system.

In addition, in the HUD disclosed in JP2014-199385A, it is necessary to calculate a distortion correction parameter in advance for storage. However, as described above, variation easily occurs in the shapes of the windshields.

In order to accurately perform distortion correction, an operation for calculating and storing distortion correction parameters based on shapes of windshields for each vehicle is necessary. In particular, in a case where a projection range of image light becomes large, the number of distortion correction parameters increases, and the operation becomes burdensome. Accordingly, the manufacturing cost of the HUD and a vehicle on which the HUD is mounted increases.

The invention has been made in consideration of the above-mentioned problems, and an object of the invention is to provide a projection type display device, a projection display method, and a non-transitory computer readable recording medium storing a projection display program capable of presenting a virtual image with less distortion with respect to a windshield of any shape to an occupant while reducing the cost.

According to an aspect of the invention, there is provided a projection type display device comprising: a projection display unit that includes a light source, a light modulation element that spatially modulates light emitted from the light source on the basis of image data, and a projection unit that projects image light that is spatially modulated by the light modulation element onto a windshield of a vehicle; a sight line detection unit that detects a line of sight of an occupant of the vehicle; a measurement data acquisition unit that acquires measurement data on shape of a predetermined region including a point that intersects the line of sight detected by the sight line detection unit, in a projectable range where the image light is projectable onto the windshield; a correction data generation unit that generates, on the basis of the measurement data acquired by the measurement data acquisition unit and a direction of the line of sight detected by the sight line detection unit, correction data for correcting distortion of an image in a state where the image based on the image light projected onto the region where the measurement data is acquired is viewed in the direction; and an image data correction unit that corrects the image data using the correction data generated by the correction data generation unit.

According to another aspect of the invention, there is provided a projection display method for projecting image light obtained by modulating light emitted from a light source on the basis of image data onto a windshield of a vehicle, the method comprising: a sight line detection step of detecting a line of sight of an occupant of the vehicle; a measurement data acquisition step of acquiring measurement data on shape of the windshield of a predetermined region including a point that intersects the line of sight detected by the sight line detection step, in a projectable range where the image light is projectable onto the windshield; a correction data generation step of generating, on the basis of the measurement data acquired by the measurement data acquisition step and a direction of the line of sight detected by the sight line detection step, correction data for correcting distortion of an image in a state where the image based on the image light projected onto the region where the measurement data is acquired is viewed in the direction; and an image data correction step of correcting the image data using the correction data generated by the correction data generation step.

According to still another aspect of the invention, there is provided a non-transitory computer readable recording medium storing a projection display program that causes a computer to execute a projection display method for projecting image light obtained by modulating light emitted from a light source on the basis of image data onto a windshield of a vehicle, the method comprising: a sight line detection step of detecting a line of sight of an occupant of the vehicle; a measurement data acquisition step of acquiring measurement data on shape of the windshield of a predetermined region including a point that intersects the line of sight detected by the sight line detection step, in a projectable range where the image light is projectable onto the windshield; a correction data generation step of generating, on the basis of the measurement data acquired by the measurement data acquisition step and a direction of the line of sight detected by the sight line detection step, correction data for correcting distortion of an image in a state where the image based on the image light projected onto the region where the measurement data is acquired is viewed in the direction; and an image data correction step of correcting the image data using the correction data generated by the correction data generation step.

According to the invention, it is possible to provide a projection type display device, a projection display method, and a non-transitory computer readable recording medium storing a projection display program capable of presenting a virtual image with less distortion with respect to a windshield of any shape to an occupant while reducing the cost.

BRIEF DESCRIPTION OF THE DRAWINGS

FIG. 12 is a diagram showing a relationship between an overlook angle of a driver and a windshield.

DESCRIPTION OF THE PREFERRED EMBODIMENTS

Hereinafter, an embodiment of the invention will be described with reference to the accompanying drawings.

Figure 1:
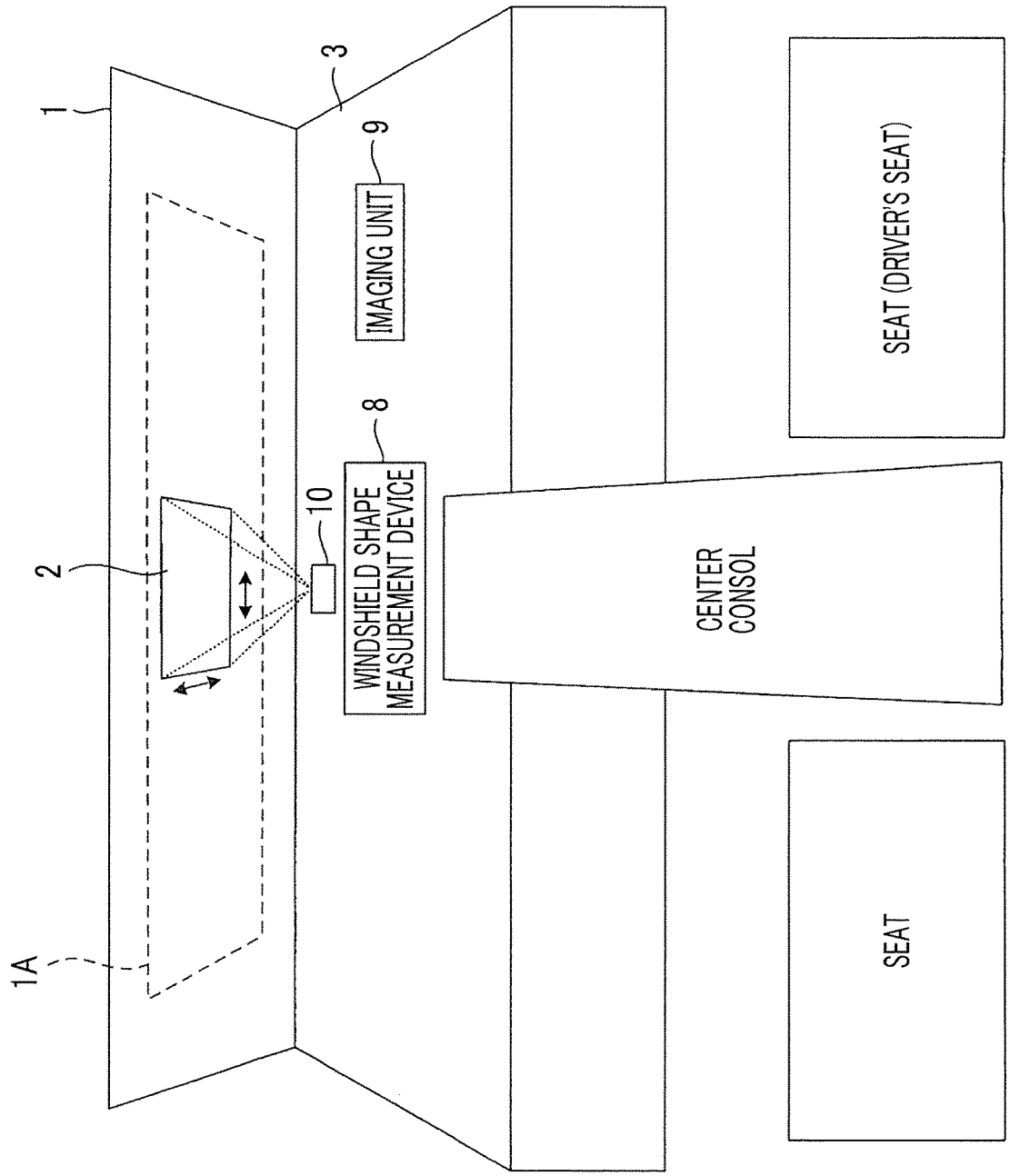
FIG. 1 is a schematic diagram in a state where a front side of a driver's seat is viewed from an upper side in a vehicle cabin of an automobile on which a projection display system including a projection type display device according to an embodiment of the invention is mounted.

FIG. 1 is a schematic diagram in a state where a front side of a driver's seat is viewed from an upper side in a vehicle cabin of an automobile on which a projection display system including a projection type display device according to an embodiment of the invention is mounted. The projection display system in FIG. 1 is not limited to the automobile, and may be generally applied to a vehicle having a windshield, such as a train, a heavy machine, a construction machine, an aircraft, a ship or an agricultural machine.

The projection display system shown in FIG. 1 includes a windshield 1 of an automobile, an HUD 10 that is a projection type display device that projects image light onto the windshield 1, a windshield shape measurement device 8 that is configured to communicate with the HUD 10 in a wireless or wired manner, and an imaging unit 9 that is configured to communicate with the HUD 10 in a wireless or wired manner.

In the example of FIG. 1, the HUD 10 is provided in a dashboard 3 of the automobile, and projects the image light toward the windshield 1 through an opening provided in the dashboard 3.

The HUD 10 is configured to scan a projection range 2 of the image light with respect to the windshield 1 in two dimensions along a surface of the windshield 1 to be able to project the image light in a wide-range projectable range 1A.

The imaging unit 9 is provided to image a facial part including the eyes of a driver who is an occupant of an automobile in order to detect the line of sight of the driver. The imaging unit 9 may be prepared as an exclusive imaging unit for the projection display system, or may be an imaging unit that is separately provided in the automobile.

The windshield shape measurement device 8 is a measurement device that measures a three-dimensional shape of an object that is provided in the automobile, which measures a three-dimensional shape of the windshield 1. The windshield shape measurement device 8 may employ a depth sensor, for example.

The depth sensor may employ known types of sensors such as a type of sensor for calculating a distance to an object using a time-of-flight method or the like using an infrared light emitting part and an infrared light receiving part, a type of sensor for calculating a distance to an object on the basis of data on two captured images obtained by imaging the object using two cameras, or a type of sensor for calculating a distance to an object on the basis of data on a plurality of captured images obtained by imaging the object at a plurality of positions while moving one camera.

The windshield shape measurement device 8 may be provided as an exclusive device for the projection display system, or may employ a depth sensor that is mounted for a separate purpose in the automobile.

Figure 2:
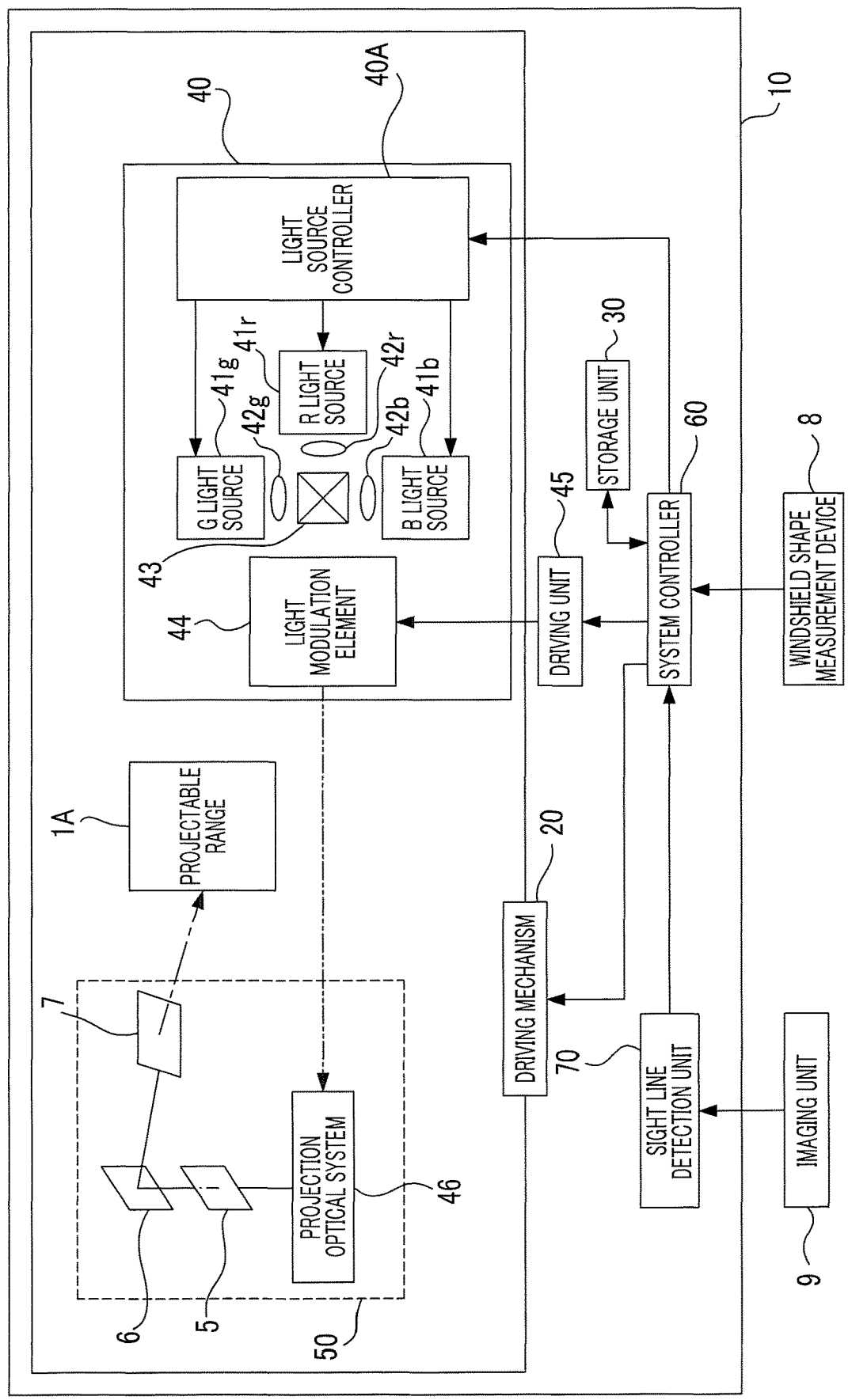
FIG. 2 is a schematic diagram showing an internal configuration of an HUD 10 shown in FIG. 1.

FIG. 2 is a schematic diagram showing an internal configuration of the HUD 10 shown in FIG. 1.

The HUD 10 includes a storage unit 30 including a storage medium such as a read-only memory (ROM) or a random access memory (RAM), a light source unit 40, a projection unit 50, a driving mechanism 20 for driving a housing that accommodates the light source unit 40 and the projection unit 50, a driving unit 45 that drives a light modulation element 44 included in the light source unit 40, a system controller 60 that generally controls the entire components, a sight line detection unit 70, and a communication interface (not shown) for communicating with the windshield shape measurement device 8 and the imaging unit 9.

The light source unit 40 includes a light source controller 40A, an R light source 41r that is a red light source that emits red light, a G light source 41g that is a green light source that emits green light, a B light source 41b that is a blue light source that emits blue light, a dichroic prism 43, a collimator lens 42r that is provided between the R light source 41r and the dichroic prism 43, a collimator lens 42g that is provided between the G light source 41g and the dichroic prism 43, a collimator lens 42b that is provided between the B light source 41b and the dichroic prism 43, and a light modulation element 44. The R light source 41r, the G light source 41g, and the B light source 41b form light sources of the HUD 10.

The R light source 41r, the G light source 41g, and the B light source 41b respectively employ a light emitting element such as laser or a light emitting diode. In this embodiment, the HUD is configured to include three light sources of the R light source 41r, the G light source 41g, and the B light source 41b, but the number of light sources may be 1, 2, 4 or more.

The light source controller 40A sets the amounts of luminescence of the R light source 41r, the G light source 41g, and the B light source 41b into predetermined luminescence amount patterns, and performs a control for sequentially emitting light from the R light source 41r, the G light source 41g, and the B light source 41b according to the luminescence amount patterns. The control of light emission of the light sources is not limited thereto, and known control methods may be employed.

The dichroic prism 43 is an optical member for guiding light emitted from each of the R light source 41r, the G light source 41g, and the B light source 41b to the same optical path. The dichroic prism 43 transmits red light that is collimated by the collimator lens 42r to be emitted to the light modulation element 44.

Further, the dichroic prism 43 reflects green light that is collimated by the collimator lens 42g to be emitted to the light modulation element 44. Further, the dichroic prism 43 reflects blue light that is collimated by the collimator lens 42b to be emitted to the light modulation element 44.

An optical member having such a function of guiding light to the same optical path is not limited to a dichroic prism. For example, a cross dichroic mirror may be used.

The light modulation element 44 spatially modulates light emitted from the dichroic prism 43 on the basis of image data input through the system controller 60, and emits image light (red color image light, blue color image light, and green color image light) based on the image data to the projection unit 50.

The image data represents data for displaying, for example, information indicating a traveling speed of an automobile, information for performing notification to a driver, navigation information, or the like.

The light modulation element 44 may employ, for example, a liquid crystal on silicon (LCOS), a digital micromirror device (DMD), a micro electro mechanical systems (MEMS) element, a liquid crystal display device, or the like.

The driving unit 45 drives the light modulation element 44 according to image data input through the system controller 60, and causes the light modulation element 44 to emit image light based on the image data to the projection unit 50.

The projection unit 50 includes a projection optical system 46, a diffuser plate 5, a reflecting mirror 6, and a magnifying glass 7.

The projection optical system 46 is an optical system for projecting image light that is spatially modulated by the light modulation element 44 onto the diffuser plate 5. The optical system is not limited to a lens, and may employ a scanner.

The projection unit 50 is optically designed so that an image based on image light projected onto the windshield 1 can be visually recognized by a driver as a virtual image at a position in front of the windshield 1.

The projection unit 50 forms a projection unit that projects image light that is spatially modulated by the light modulation element 44 onto the windshield 1. The light sources including the R light source 41r, the G light source 41g and the B light source 41b, the light modulation element 44, and the projection unit 50 form a projection display unit of the HUD 10.

The sight line detection unit 70 acquires captured image data obtained by imaging of the imaging unit 9, and performs a known sight line detection process with respect to data of the acquired captured image to detect a line of sight of a driver who is an occupant of an automobile in which the HUD 10 is mounted. The sight line detection unit 70 notifies the system controller 60 of the sight line detection result (information on a direction of the line of sight).

The housing in which the projection unit 50 and the light source unit 40 are accommodated is able to be panned or tilted by the driving mechanism 20. The projection range 2 of image light projected from the projection unit 50 may be scanned on the windshield 1 using the driving mechanism 20. The driving mechanism 20 is controlled by the system controller 60.

The HUD 10 may move the projection range 2 of the image light projected from the projection unit 50 on the windshield 1, and for example, may move the projection range 2 by making an optical member included in the projection unit 50 movable.

The system controller 60 controls the light source controller 40A and the driving unit 45, so that image light based on image data is projected onto the projection unit 50 from the light source unit 40. The system controller 60 controls the driving mechanism 20 on the basis of the line of sight detected by the sight line detection unit 70 to control the position of the projection range 2 in the projectable range 1A.

Figure 3:
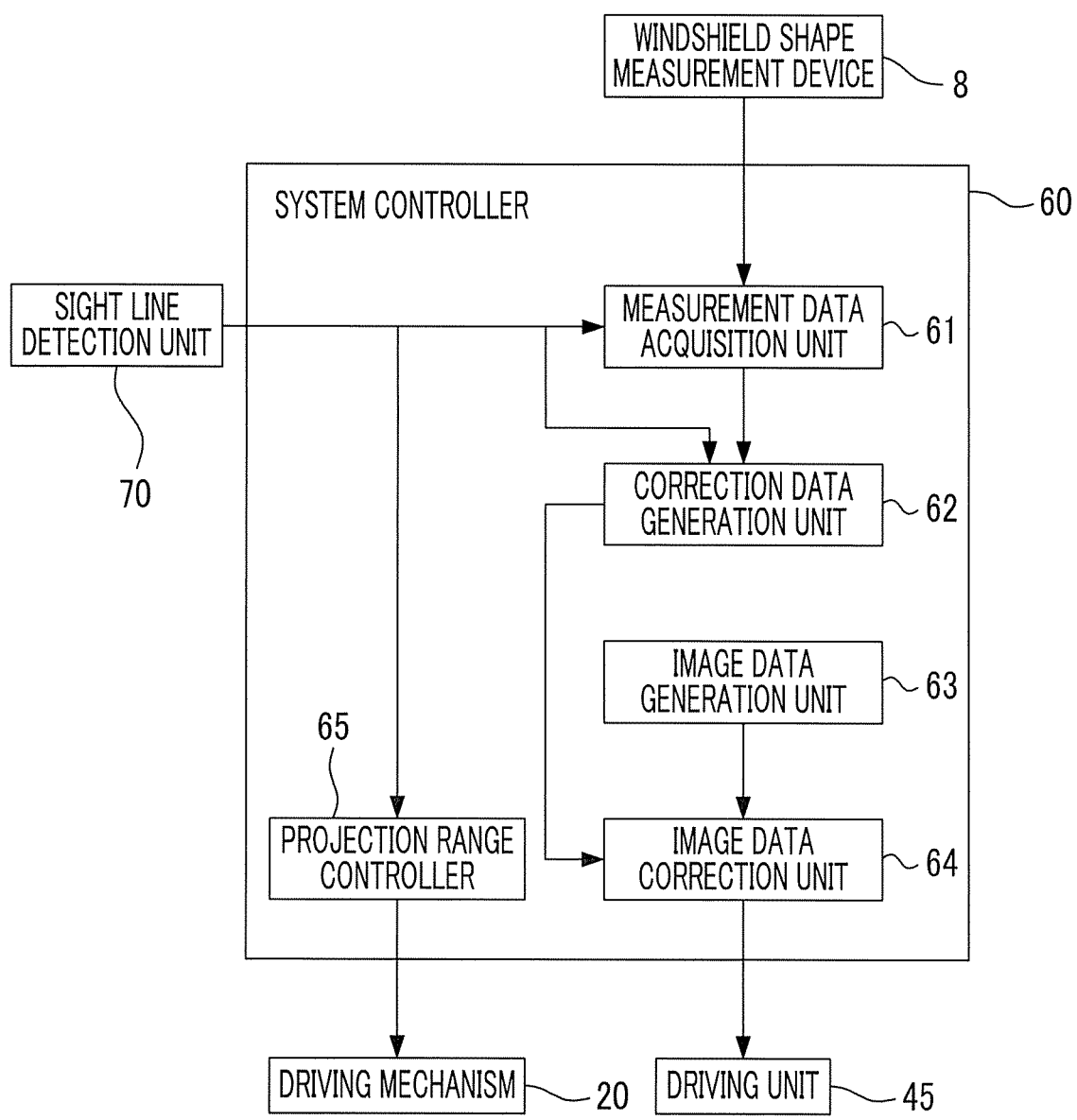
FIG. 3 is a block diagram showing an internal configuration of a system controller 60 shown in FIG. 2.

FIG. 3 is a block diagram showing an internal configuration of the system controller 60 in FIG. 2.

The system controller 60 is configured using a processor as a main part, and functions as a measurement data acquisition unit 61, a correction data generation unit 62, an image data generation unit 63, an image data correction unit 64, and a projection range controller 65 as the processor executes a program storage in the ROM of the storage unit 30.

The projection range controller 65 controls the position of the projection range 2 in the projectable range 1A on the basis of the line of sight of the driver detected by the sight line detection unit 70. The projection range controller 65 controls the driving mechanism 20 to change a projection direction of image light, to thereby perform a position control of the projection range 2.

In the storage unit 30 of the HUD 10, projection range control data determined by setting the projection range 2 to a position in the projectable range 1A is stored in association with the direction of the line of sight of the driver.

The projection range controller 65 determines the position of the projection range 2 corresponding to the direction of the line of sight of the driver on the basis of the projection range control data and the line of sight of the driver detected by the sight line detection unit 70. The projection range control data represents data in which a region including a point that intersects the line of sight of the driver in the projectable range 1A is determined as the projection range 2.

The image data generation unit 63 generates image data to be input to the driving unit 45 on the basis of a situation of the automobile, for example. The image data includes information necessary for driving assistance. Further, the situation of the automobile may be information indicating an operating situation of the automobile, the residual amount of gasoline, or the like.

The measurement data acquisition unit 61 acquires measurement data on the shape of a predetermined region including a point that intersects the line of sight detected by the sight line detection unit 70 in the projectable range 1A in the windshield 1, from the windshield shape measurement device 8.

In the ROM of the storage unit 30, plane coordinates data formed by coordinates indicating respective positions in the projectable range 1A when the windshield 1 is seen from the inside of the vehicle and table data in which, for each set of coordinates in the plane coordinates data, the direction of the line of sight of the driver when the line of sight intersects the coordinates is associated are stored. The table data is data determined at a design stage of the projection display system.

If the direction of the line of sight of the driver is notified from the sight line detection unit 70, the measurement data acquisition unit 61 calculates coordinates (sight line intersection coordinates) of the point that intersects the line of sight of the driver in the projectable range 1A on the basis of the table data in the storage unit 30.

Further, the measurement data acquisition unit 61 notifies the windshield shape measurement device 8 of area coordinates information indicating a predetermined range (for example, a plane range in which centimeters high and centimeters wide are designated) centering around the sight line intersection coordinates.

The windshield shape measurement device 8 sets a measurement range in a planar view of the windshield 1 on the basis of the notified area coordinates information, measures a three-dimensional shape of a part of the windshield 1 that overlaps the set measurement range, and transmits the measurement data to the measurement data acquisition unit 61.

In this way, the measurement data acquisition unit 61 acquires measurement data on a three-dimensional shape of a predetermined region (a region that overlaps a plane range specified by the area coordinates information) including the coordinates (sight line intersection coordinates) that intersect the line of sight of the driver detected by the sight line detection unit 70 in the projectable range 1A in the windshield 1. The region that is a measurement data acquisition target is hereinafter referred to as a measurement data acquisition region.

In the projection display system of FIG. 1, the measurement data acquisition region and the projection range of the image light determined by the projection range controller 65 are designed to be equal to each other.

The correction data generation unit 62 generates, on the basis of the measurement data acquired by the measurement data acquisition unit 61 and the direction of the line of sight detected by the sight line detection unit 70, correction data for correcting distortion of an image in a state where the image based on image light projected onto the measurement data acquisition region is viewed in the direction of the line of sight detected by the sight line detection unit 70. The correction data generation unit 62 transmits the generated correction data to the image data correction unit 64.

As described above, since the measurement data acquisition region and the projection range 2 are set to be equal to each other, image light based on the image data is projected onto the measurement data acquisition region.

An appearance of the image based on the image light projected onto the measurement data acquisition region is changed according to a combination of the three-dimensional shape of the measurement data acquisition region and an observation direction of the image. For this reason, it is necessary to correct image data that is a source of the image light to be projected onto the measurement data acquisition region so that an image is observed in a state where least distortion is present in the combination of the three-dimensional shape of the measurement data acquisition region and the observation direction (the direction of the line of sight) with respect to the measurement data acquisition region.

The correction data generation unit 62 generates correction data for correcting image data generated by the image data generation unit 63 so that distortion does not occur in the image based on the image light projected onto the measurement data acquisition region, with respect to the combination of the three-dimensional shape of the measurement data acquisition region and the observation direction (the direction of the line of sight detected by the sight line detection unit 70) of the image based on the image light projected onto the measurement data acquisition region.

The image data correction unit 64 corrects the image data generated by the image data generation unit 63 using the correction data received from the correction data generation unit 62.

The image data correction unit 64 inputs image data after correction to the driving unit 45, and projects image light based on the image data after correction onto a partial range (measurement data acquisition region) on the projectable range 1A controlled by the projection range controller 65.

An operation of the HUD 10 configured as described above will be described.

In a case where the projection display system is started and the line of sight of the driver is detected by the sight line detection unit 70, the system controller 60 controls the driving mechanism 20 on the basis of the detected line of sight of the driver, and controls the position of the projection range 2 of image light projected from the projection unit 50.

Then, the system controller 60 acquires measurement data on a three-dimensional shape of a measurement data acquisition region including a point that intersects the line of sight of the driver detected by the sight line detection unit 70 in the projectable range 1A from the windshield shape measurement device 8.

The system controller 60 generates correction data on the basis of the measurement data acquired from the windshield shape measurement device 8 and the direction of the line of sight of the driver detected by the sight line detection unit 70.

Thereafter, the system controller 60 generates image data that is a source of image light to be projected onto the projection range 2, and corrects the image data using the correction data.

Further, the system controller 60 inputs the image data after correction to the driving unit 45, and projects image light based on the image data after correction onto a partial range on the projectable range 1A. Then, in a case where there is a change of a certain degree or larger in the line of sight of the driver detected by the sight line detection unit 70, the system controller 60 performs the above-described processes again.

As described above, in a case where the HUD 10 is used and the driver moves the line of sight in the projectable range 1A, the projection range 2 moves along the movement of the sight line, and image light is projected onto the projection range 2. Further, a virtual image based on the image light is corrected in a state where distortion is not present when seen from the driver. Thus, it is possible to present a natural virtual image with no distortion over the entirety of the projectable range 1A to the driver.

In addition, the HUD 10 generates correction data using measurement data on a three-dimensional shape of the windshield 1 measured by the windshield shape measurement device 8. Thus, it is possible to execute optimal distortion correction for each vehicle, without receiving the influence of a vehicle model of an automobile or the influence of individual variation of the shape of the windshield 1.

As a result, it is possible to simplify an adjustment operation of the optical system included in the projection unit 50, or to remove a generation operation of correction data, and thus, it is possible to reduce the manufacturing cost.

Hereinafter, a modification example of the HUD 10 shown in FIG. 1 will be described.

First Modification Example

Figure 4:
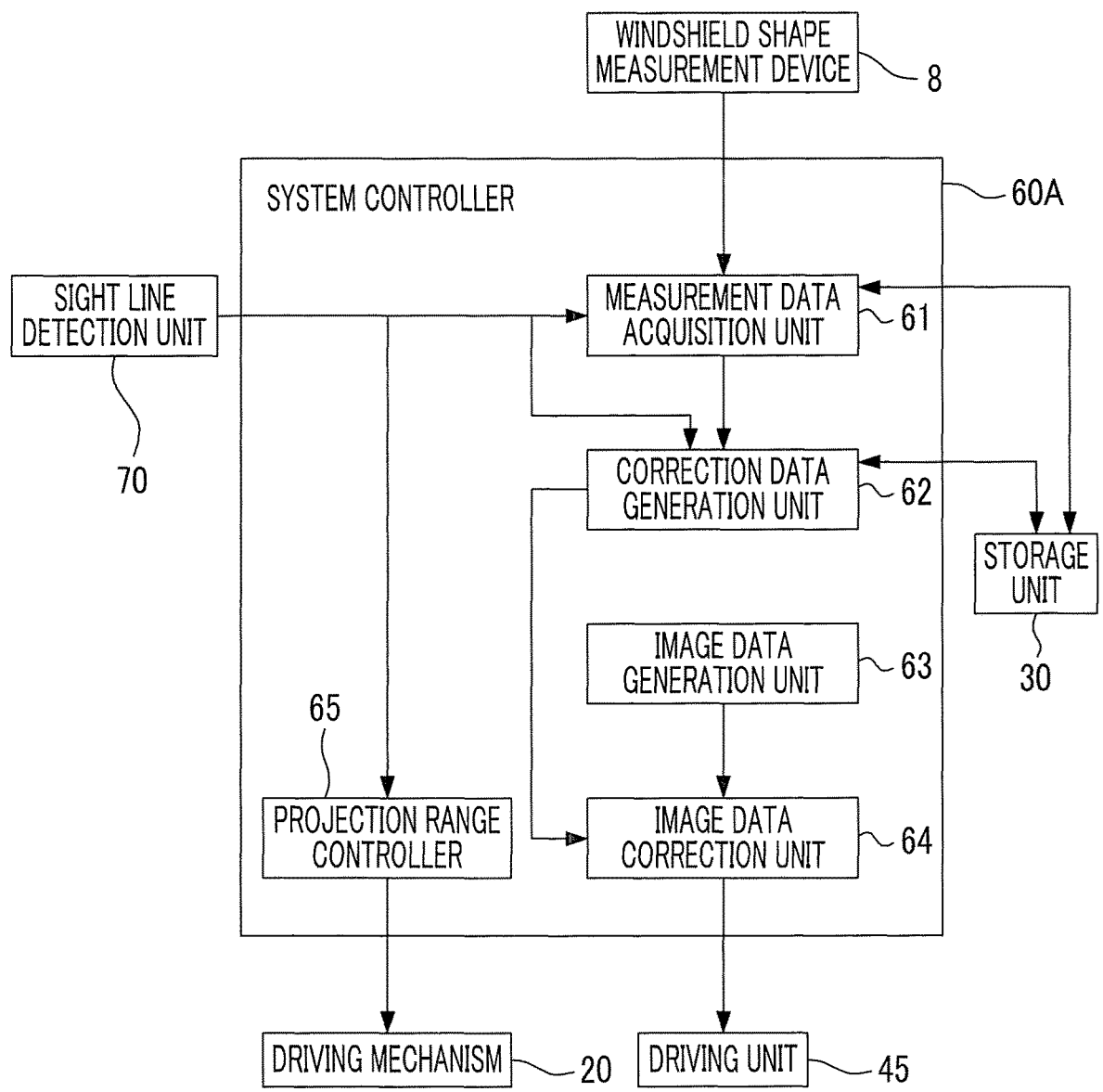
FIG. 4 is a block diagram showing an internal configuration of a system controller 60A that is a modification example of the system controller 60 shown in FIG. 2.

FIG. 4 is a block diagram showing an internal configuration of a system controller 60A that is a modification example of the system controller 60 shown in FIG. 2. The system controller 60A of FIG. 4 has the same configuration as that of the system controller 60 in FIG. 3 except that the functions of the measurement data acquisition unit 61 and the correction data generation unit 62 are partially different therefrom. Accordingly, only parts that are different from those in FIG. 3 will be described.

In a case where the correction data generation unit 62 of the system controller 60A generates correction data using the above-described method, the correction data generation unit 62 stores the correction data in the ROM of the storage unit 30 in association with the direction of a line of sight used for generation of the correction data.

In a case where there is a change in the line of sight detected by the sight line detection unit 70, the correction data generation unit 62 of the system controller 60A acquires the direction of the line of sight detected by the sight line detection unit 70, and determines whether correction data corresponding to the direction of the line of sight is stored in the storage unit 30.

In a case where the corresponding correction data is stored in the storage unit 30, the correction data generation unit 62 of the system controller 60A reads out the correction data corresponding to the direction of the line of sight from the storage unit 30, and transmits the result to the image data correction unit 64, and does not perform a correction data generation process using the direction of the line of sight.

In a case where there is a change in the line of sight detected by the sight line detection unit 70, the measurement data acquisition unit 61 of the system controller 60A determines whether the correction data corresponding to the direction of the line of sight detected by the sight line detection unit 70 is stored in the storage unit 30. In a case where the corresponding correction data is stored in the storage unit 30, the measurement data acquisition unit 61 does not perform a measurement data acquisition process using the direction of the line of sight.

As described above, according to the first modification example, after the correction data is generated in a state where the line of sight of the driver is in an arbitrary direction, in a case where the driver greatly moves the line of sight from the random direction and then returns the line of sight to the random direction again, the measurement data acquisition process and the correction data generation process are not performed, and correction of image data using the correction data stored in the storage unit 30 is performed.

Thus, it is possible to reduce the processing load of the system controller 60A, to thereby reduce power consumption of the HUD 10.

Second Modification Example

Figure 5:
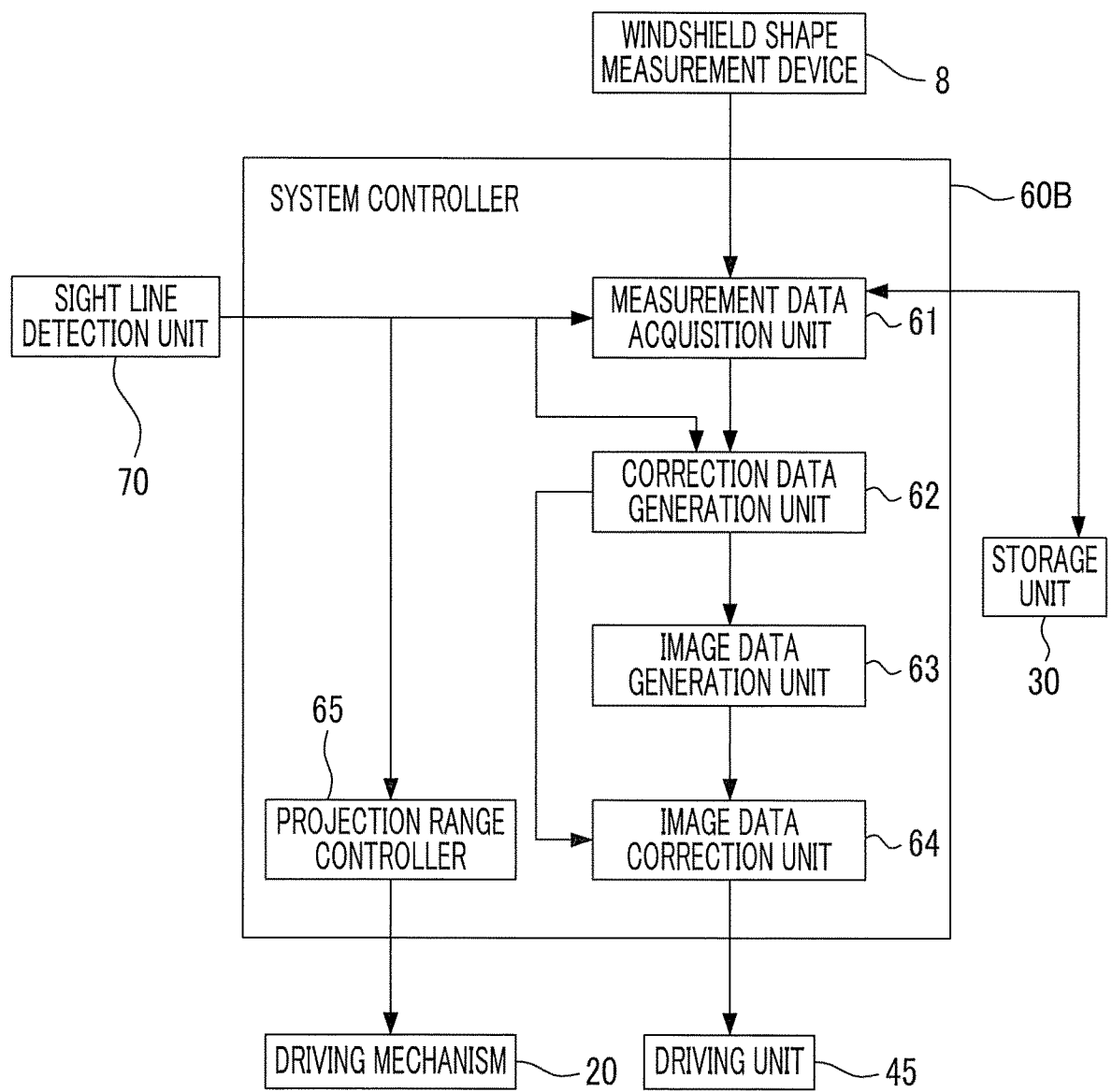
FIG. 5 is a block diagram showing an internal configuration of a system controller 60B that is a modification example of the system controller 60 shown in FIG. 2.

FIG. 5 is a block diagram showing an internal configuration of a system controller 60B that is a modification example of the system controller 60 shown in FIG. 2. The system controller 60B in FIG. 5 has the same configuration as that of the system controller 60 in FIG. 3 except for a function of the measurement data acquisition unit 61 is partially different therefrom. Accordingly, only parts that are different from those in FIG. 3 will be described.

When the projection display system is started, the measurement data acquisition unit 61 of the system controller 60B acquires measurement data on a three-dimensional shape of the entirety of the projectable range 1A of the windshield 1 from the windshield shape measurement device 8, and stores the result in the ROM of the storage unit 30. The storage unit 30 in the second modification example forms a measurement data storage unit.

Further, the measurement data acquisition unit 61 of the system controller 60B extracts measurement data on the shape of a predetermined region including a point that intersects the line of sight detected by the sight line detection unit 70 from the measurement data on the three-dimensional shape of the entirety of the projectable range 1A stored in the storage unit 30 to acquire the measurement data.

As described above, according to the second modification example, the three-dimensional shape of the projectable range 1A is measured when the projection display system is started. Thereafter, the measurement data acquisition unit 61 acquires necessary measurement data from the measurement data. Thus, it is possible to perform acquisition of measurement data at high speed, and to present an image with no distortion in a natural manner.

Further, according to the second modification example, the windshield shape measurement device 8 is started only when the projection display system is started, and thereafter, it is possible to turn off a power source.

Thus, it is possible to reduce entire power consumption of the system. Further, it is possible to enhance durability of the entire system through load reduction of the system controller 60B and load reduction of the windshield shape measurement device 8.

It is considered that there is a variation for each measurement in a measurement result of the three-dimensional shape in the windshield shape measurement device 8.

According to the HUD 10 shown in FIG. 1, whenever the direction of the line of sight is changed, the measurement of the three-dimensional shape is performed by the windshield shape measurement device 8, and the measurement data is acquired from the windshield shape measurement device 8. Thus, it is possible to level variation of correction accuracy of image data due to the variation of the measurement data.

The second modification example may be combined with the first modification example.

Third Modification Example

In the HUD 10 of FIG. 1, by making a projection range of image light movable by the driving mechanism 20, it is possible to display a virtual image over a wide range.

As the modification example, the projection unit 50 that is optically designed to be capable of projecting image light onto the entirety of the projectable range 1A may be used. In this modification example, as a measurement data acquisition region, for example, a region of a size of the same degree as that of a central visual field of a driver may be set.

That is, the system controller 60 generates correction data on the basis of measurement data on a three-dimensional shape of a part (a range corresponding to the central visual field of the driver) in the projectable range 1A in which image light is projected, and the direction of the line of sight of the driver, and corrects a portion corresponding to the measurement data acquisition region in image data that is a source of image light to be projected onto the projectable range 1A using the correction data. Thus, it is possible to acquire a state where there is no distortion of the image in the central visual field of the driver.

The third modification example may be combined with the first modification example or the second modification example.

Fourth Modification Example

Figure 6:
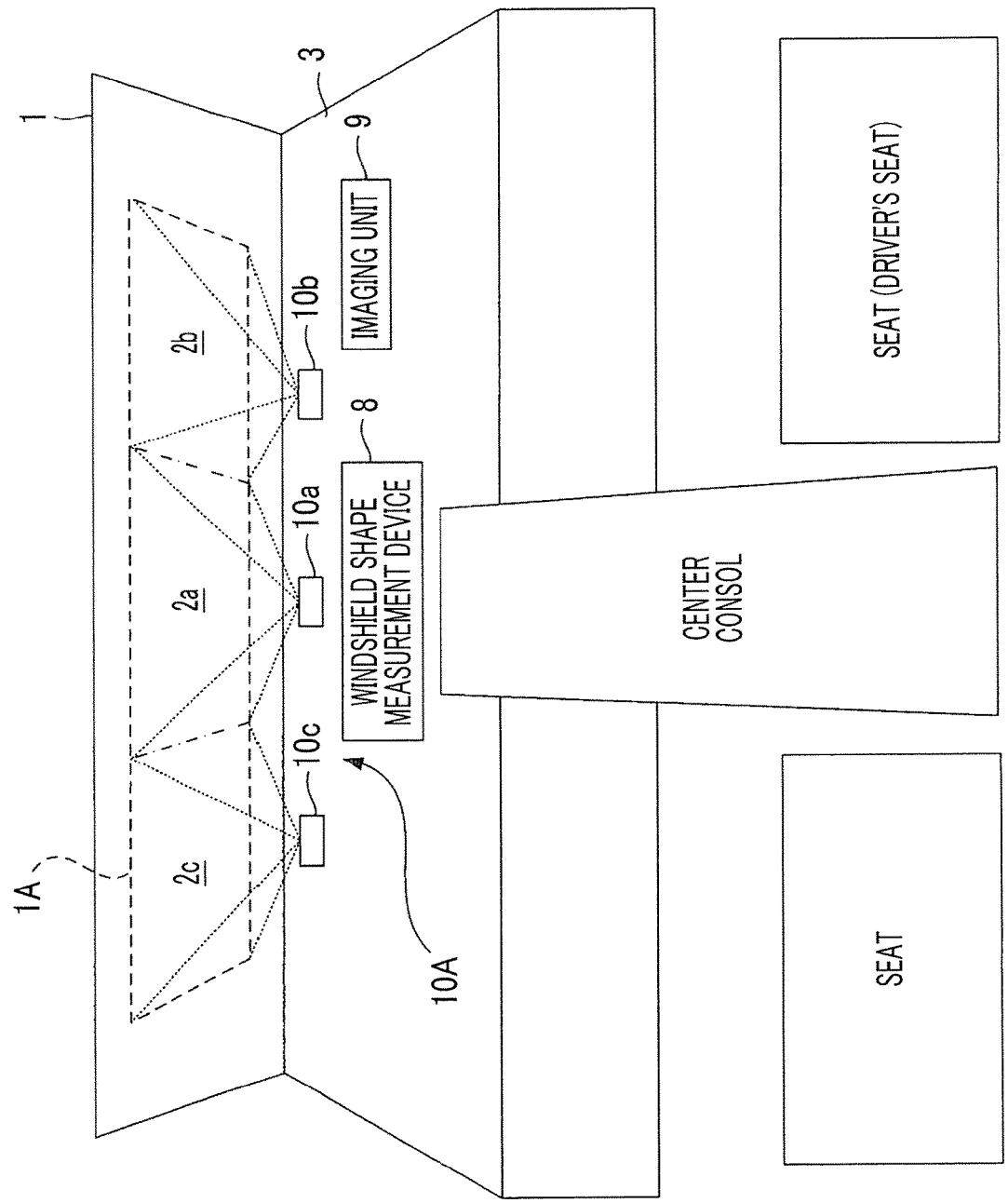
FIG. 6 is a diagram showing a modification example of the projection display system shown in FIG. 1.

FIG. 6 is a diagram showing a modification example of the projection display system shown in FIG. 1. The projection display system shown in FIG. 6 has the same configuration as that of the projection display system shown in FIG. 1 except that the HUD 10 is changed into the HUD 10A that is a projection type display device formed by a unit 10a, a unit 10b, and a unit 10c.

Figure 7:
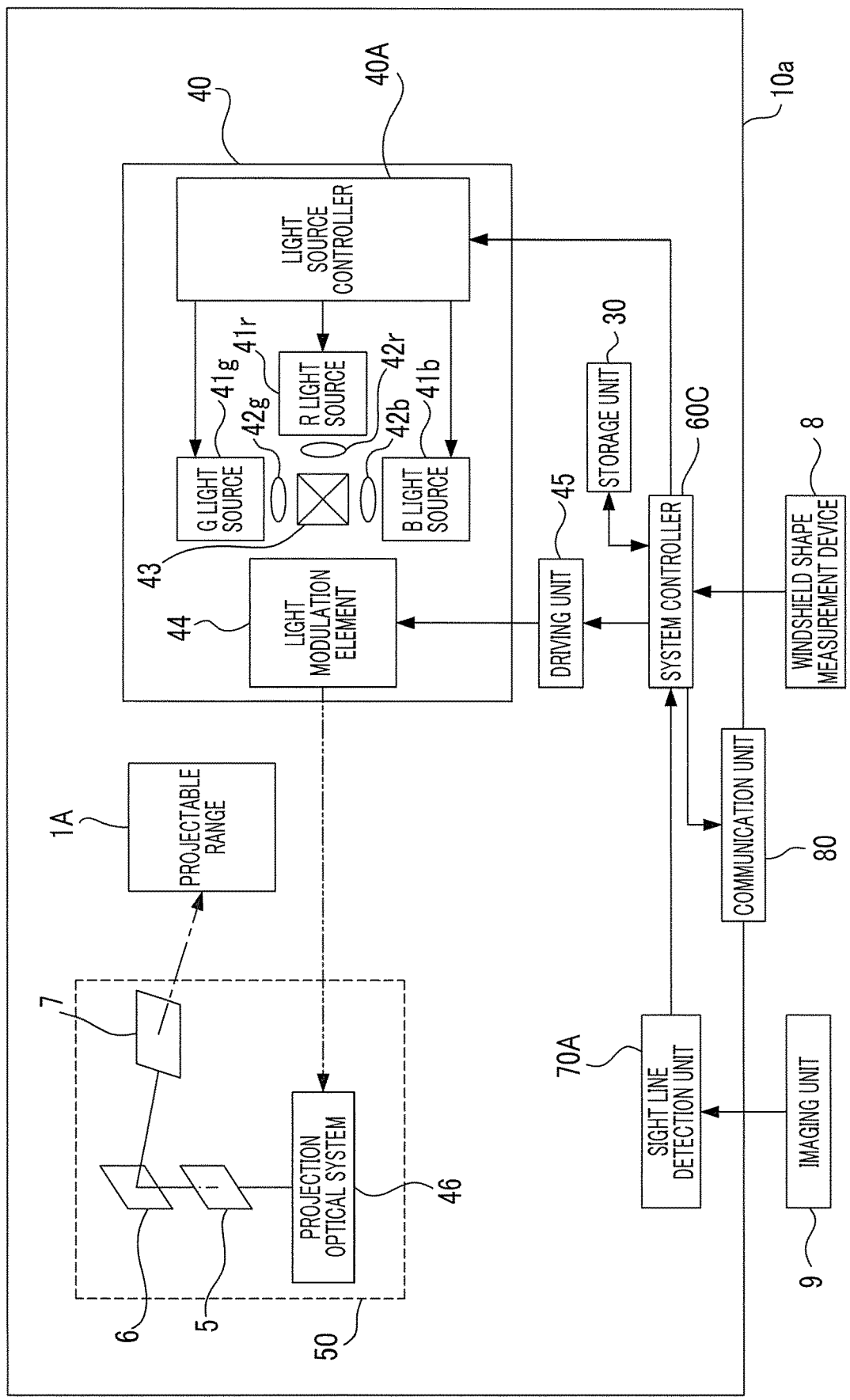
FIG. 7 is a schematic diagram showing an internal configuration of a unit 10a in the projection display system shown in FIG. 6.

FIG. 7 is a schematic diagram showing an internal configuration of the unit 10a in the projection display system shown in FIG. 6.

The unit 10a has a configuration in which the driving mechanism 20 is removed, the system controller 60 is modified into a system controller 60C, the sight line detection unit 70 is modified into a sight line detection unit 70A, and a communication unit 80 that is an interface for communicating with the unit 10b and the unit 10c is additionally provided, with respect to the HUD 10 in FIG. 1.

The sight line detection unit 70A of the unit 10a acquires captured image data obtained by imaging of the imaging unit 9, and performs a known sight line detection process with respect to the obtained captured image data, to individually detect lines of sight of a plurality of occupants of an automobile in which the HUD 10A is mounted.

Here, an example in which the sight line detection unit 70A individually detects a line of sight of a driver of an automobile and a line of sight a passenger who sits on an assistant driver's seat.

The sight line detection unit 70A notifies the system controller 60C of a detection result of the line of sight of the driver (information on the direction of the line of sight) and a detection result of the line of sight of the passenger (information on the direction of the line of sight). Distinction of the line of sight of the driver and the line of sight of the passenger may be performed according to positions of eyes on the captured image data captured by the imaging unit 9. Alternatively, iris information or a facial image may be registered for each occupant, and occupants may be distinguished according to an iris detection process or a face recognition process.

Figure 8:
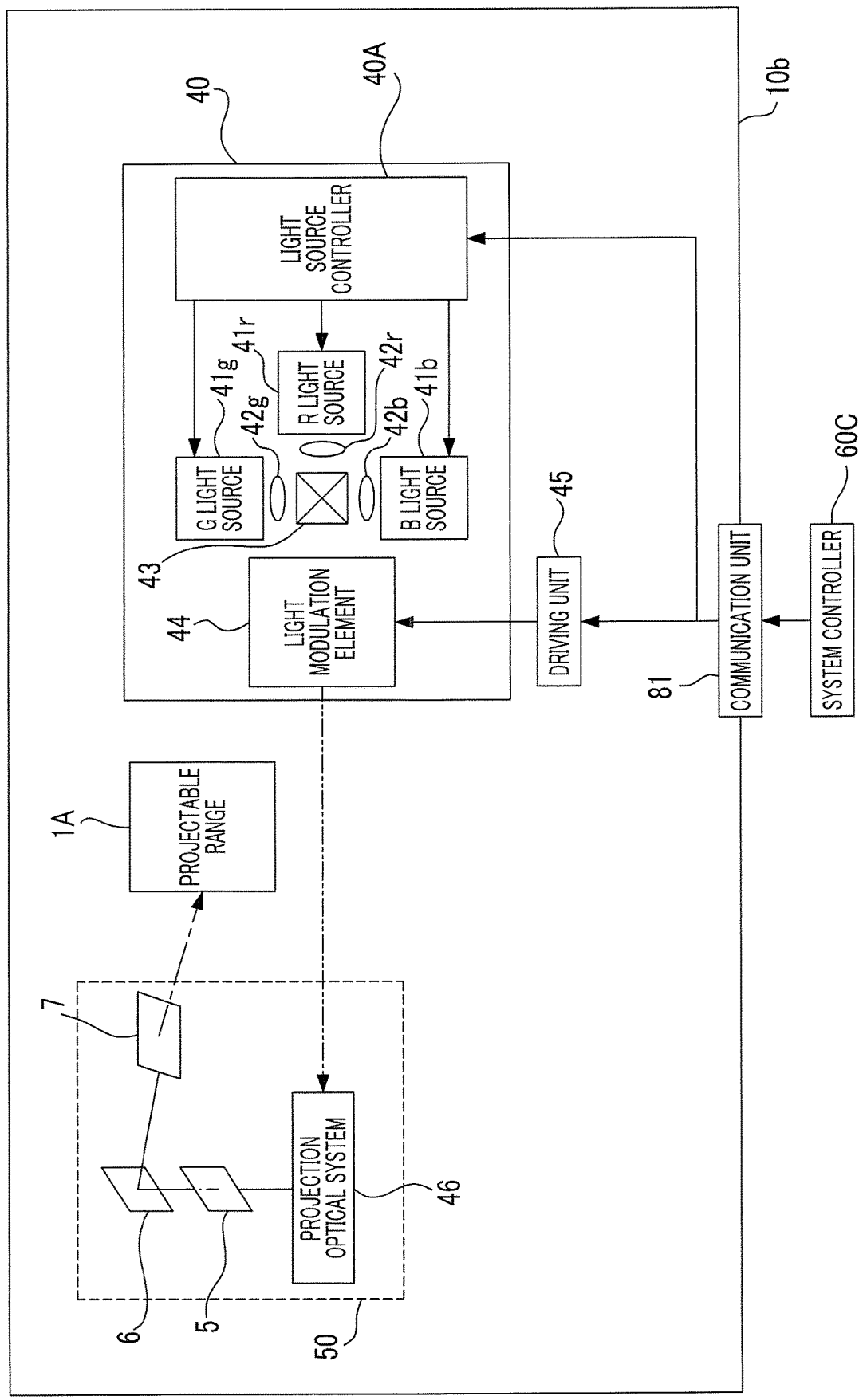
FIG. 8 is a schematic diagram showing an internal configuration of a unit 10b in the projection display system shown in FIG. 6.

FIG. 8 is a schematic diagram showing an internal configuration of the unit 10b in the projection display system shown in FIG. 6.

The unit 10b includes the projection unit 50, the light source unit 40, and the driving unit 45 in the HUD 10 of FIG. 1.

Further, the unit 10b includes a communication unit 81 that is an interface for communicating with the unit 10a. The unit 10b is configured so that the driving unit 45 and the light source controller 40A of the unit 10b can be controlled by the system controller 60C of the unit 10a through the communication unit 81.

Since an internal configuration of the unit 10c in the projection display system shown in FIG. 6 is the same as that of the unit 10b, description thereof will not be repeated.

As shown in FIG. 6, a projection range 2a of image light projected from the projection unit 50 of the unit 10a, a projection range 2b of image light projected from the projection unit 50 of the unit 10b, and a projection range 2c of image light projected from the projection unit 50 of the unit 10c are set to be arranged in one direction. The respective projection ranges may be arranged without a gap.

A range obtained by addition of the projection range 2a, the projection range 2b, and the projection range 2c may be the same as the projectable range 1A in FIG. 1.

In the HUD 10A shown in FIG. 6, a projection display unit is configured to have a light source that includes the R light source 41r, the G light source 41g, and the B light source 41b that are included in the respective units 10a to 10c, the light modulation element 44, and the projection unit 50. That is, the HUD 10A has a configuration in which a plurality of (three in the example of FIG. 6) projection display units are provided.

Figure 9:
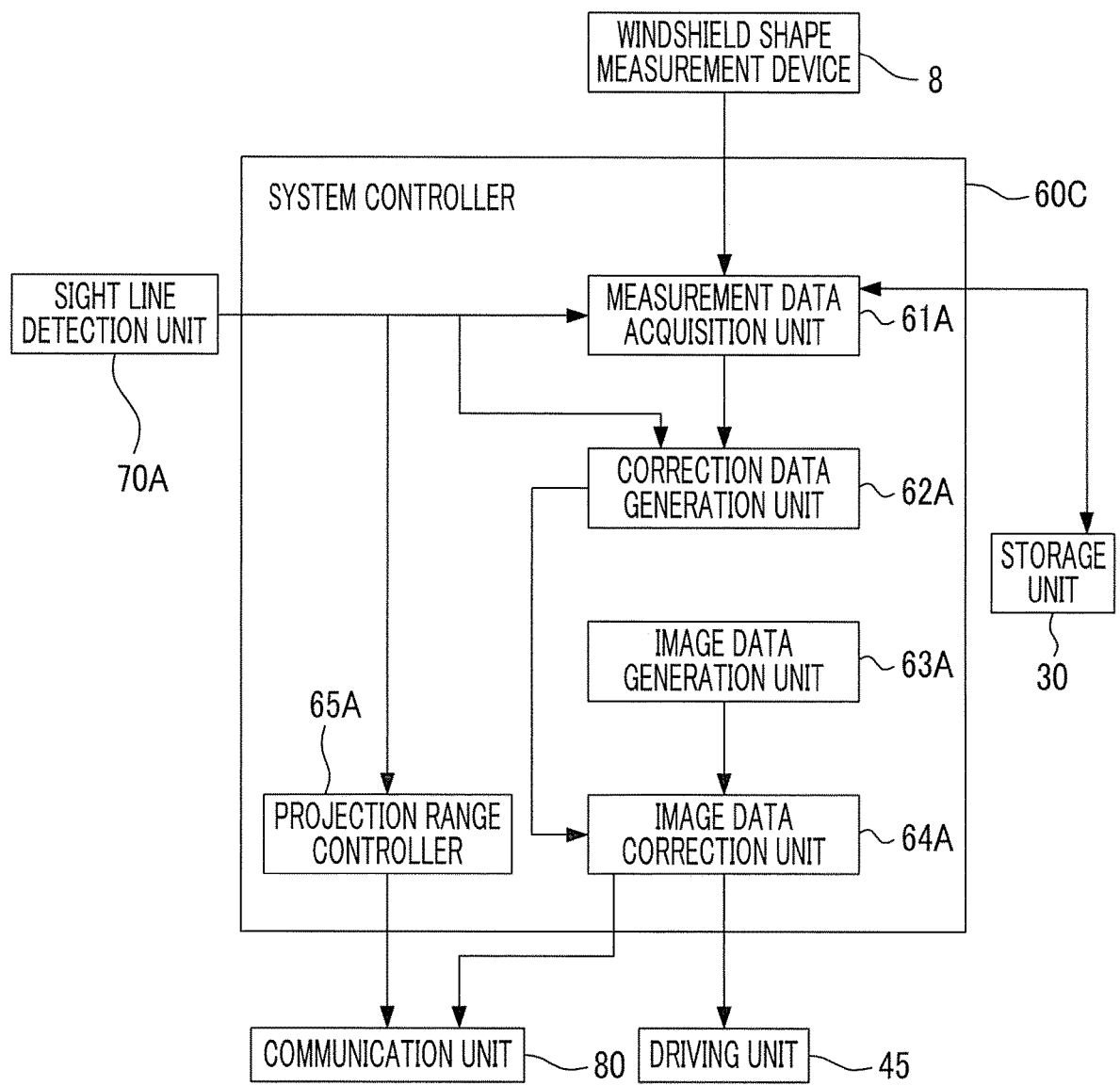
FIG. 9 is a block diagram showing an internal configuration of a system controller 60C shown in FIG. 7.

FIG. 9 is a block diagram showing an internal configuration of the system controller 60C shown in FIG. 7.

The system controller 60C is configured using a processor as a main part, functions as a measurement data acquisition unit 61A, a correction data generation unit 62A, an image data generation unit 63A, an image data correction unit 64A, and a projection range controller 65A as the processor executes a program stored in the ROM of the storage unit 30.

The projection range controller 65A controls a projection range in which the HUD 10A projects image light on the basis of the lines of sight of the driver and the passenger detected by the sight line detection unit 70A.

In the storage unit 30 of the unit 10a of the HUD 10A, projection range control data for determining which one of the projection ranges 2a to 2c image light is to be projected onto according to the direction of a line of sight is stored.

The projection range controller 65A starts a projection display unit that projects image light onto a projection range corresponding to the direction of the line of sight, on the basis of the projection range control data and the line of sight detected by the sight line detection unit 70A.

The projection range control data is configured so that a range including a point that intersects the line of sight of the driver and a range including a point that intersects the line of sight of the passenger among the projection ranges 2a to 2c that form the projectable range 1A are determined as the projection range.

Figure 10:
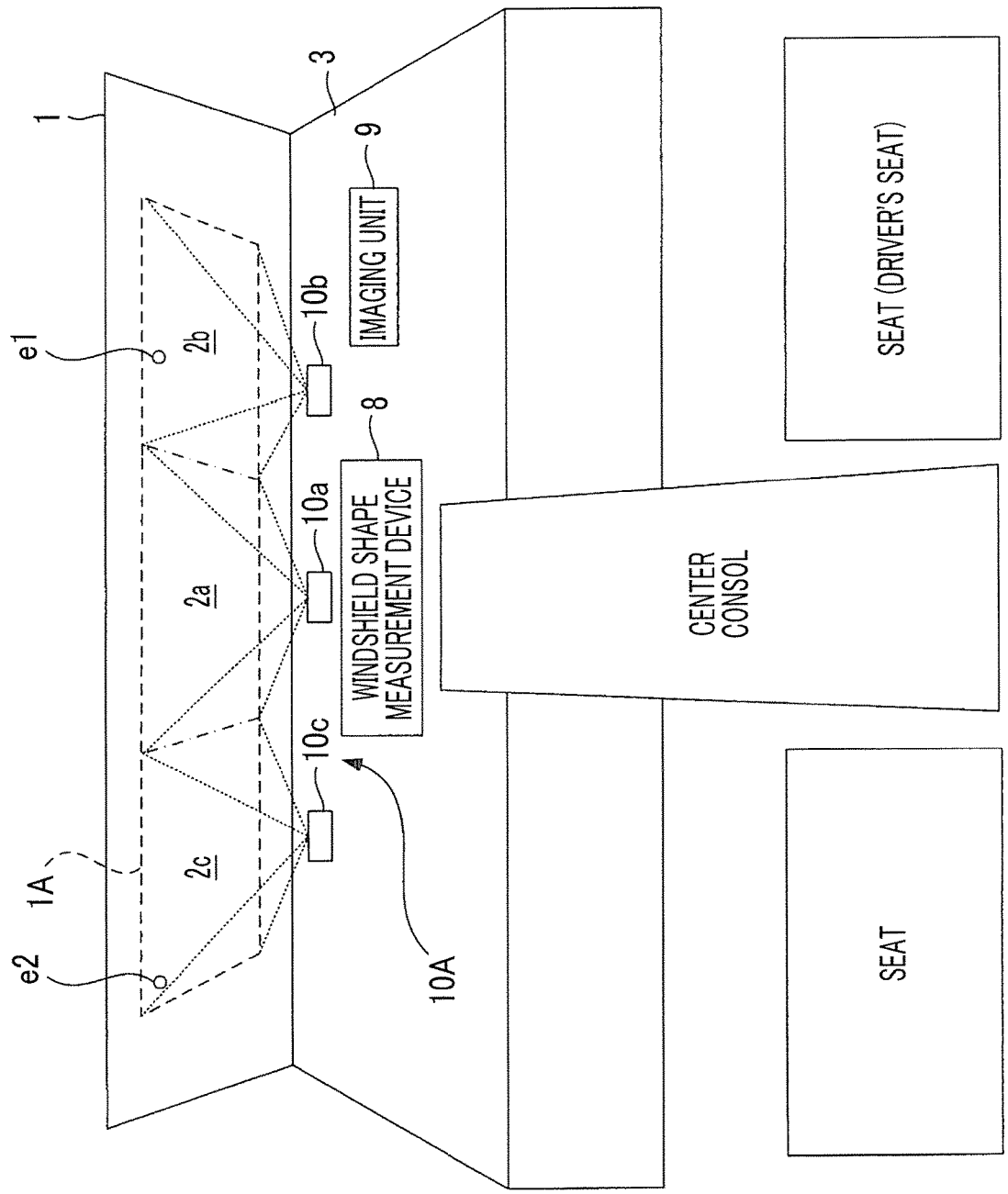
FIG. 10 is a schematic diagram illustrating a relationship between a line of sight of a driver and a projection range in the system shown in FIG. 6.

For example, as shown in FIG. 10, a case where a point where a line of sight e1 of a driver intersects the windshield 1 is present in the projection range 2b and a point where a line of sight e2 of a passenger intersects the windshield 1 is present in the projection range 2c is assumed.

In this case, the projection range controller 65A starts the projection display unit of the unit 10b and the projection display unit of the unit 10c, and controls a range obtained by addition of the projection range 2b and the projection range 2c as a projection range of image light in the HUD 10A.

Figure 11:
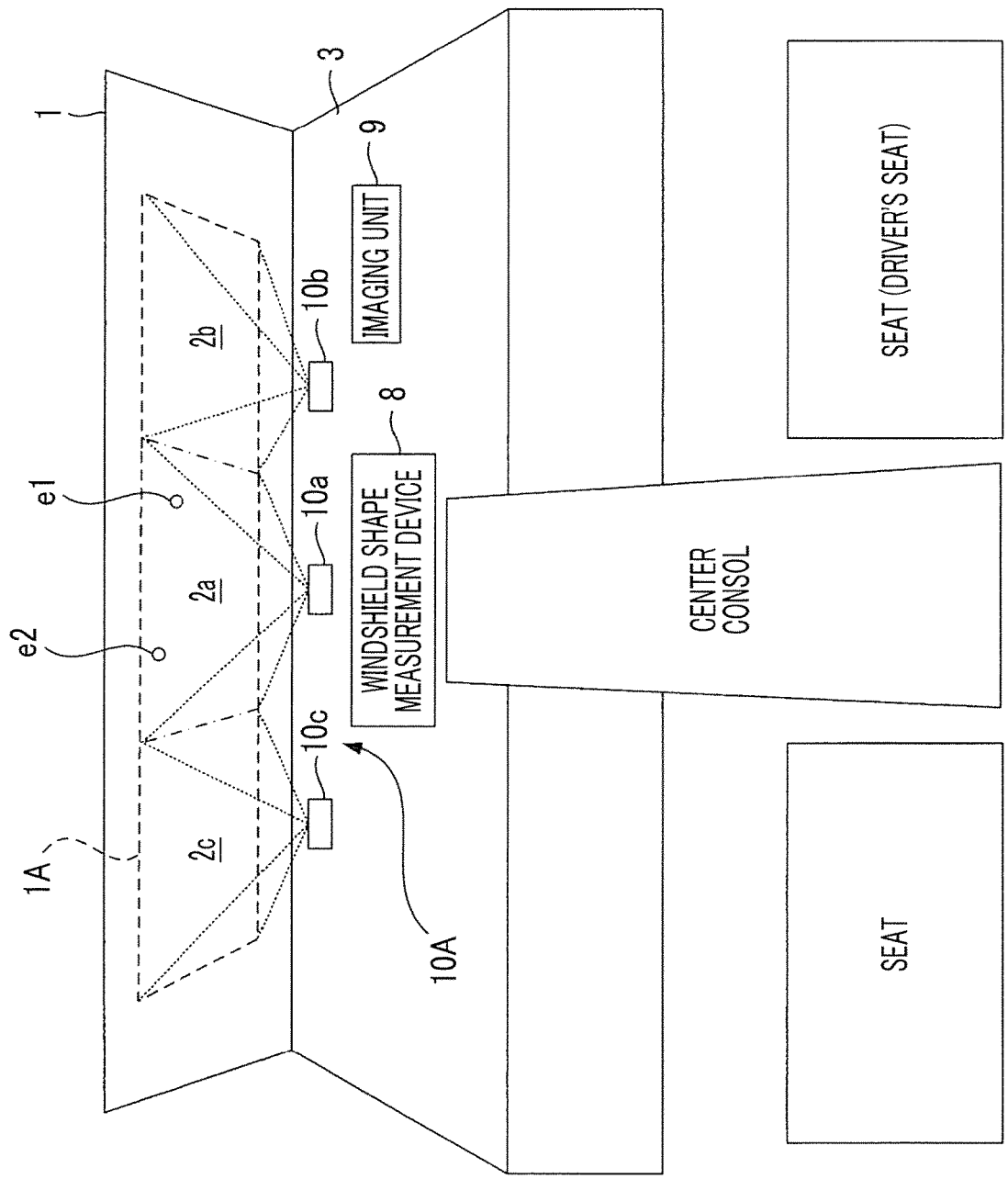
FIG. 11 is a schematic diagram illustrating a relationship between a line of sight of a driver and a projection range in the system shown in FIG. 6.

Further, as shown in FIG. 11, a case where the point where the line of sight e1 of the driver intersects the windshield 1 is present in the projection range 2a and the point where the line of sight e2 of the passenger intersects the windshield 1 is present in the projection range 2a is assumed.

In this case, the projection range controller 65A starts the projection display unit of the unit 10a, and controls the projection range 2a as the projection range of image light in the HUD 10A.

The image data generation unit 63A generates image data to be input to the driving unit 45 that drives the projection display unit started by the projection range controller 65A on the basis of a situation of the automobile, for example. The image data includes information necessary for driving assistance. Further, the situation of the automobile may be information indicating an operating situation of the automobile, a residual amount of gasoline, or the like.

The measurement data acquisition unit 61A acquires measurement data on the shape of a predetermined region including a point that intersects the line of sight of the driver detected by the sight line detection unit 70A in the projectable range 1A in the windshield 1, and measurement data on the shape of a predetermined region including a point that intersects the line of sight of the passenger detected by the sight line detection unit 70A in the projectable range 1A in the windshield 1, from the windshield shape measurement device 8.

In the storage unit 30, plane coordinates data formed by coordinates indicating respective positions in the projectable range 1A when the windshield 1 is seen from the inside of the vehicle is stored.

Further, in the storage unit 30, driver table data in which, for each set of coordinates in the plane coordinates data, the direction of the line of sight of the driver when the line of sight intersects the coordinates is stored in association is stored.

Furthermore, in the storage unit 30, passenger table data in which, for each set of coordinates in the plane coordinates data, the direction of the line of sight of the passenger when the line of sight intersects the coordinates is stored in association is stored.

The plane coordinates data, the driver table data, and the passenger table data are determined at a design stage of the projection display system.

In the plane coordinates data, information indicating the projection range 2a is associated with coordinates corresponding to the projection range 2a, information indicating the projection range 2b is associated with coordinates corresponding to the projection range 2b, and information indicating the projection range 2c is associated with coordinates corresponding to the projection range 2c.

In a case where the direction of the line of sight of the driver is notified from the sight line detection unit 70A, the measurement data acquisition unit 61A calculates coordinates (driver's sight line intersection coordinates) of the projectable range 1A that intersects the line of sight of the driver on the basis of the driver table data in the storage unit 30.

The measurement data acquisition unit 61A notifies the windshield shape measurement device 8 of driver area coordinates information indicated by all coordinates associated with the same information as information of a projection range associated with the driver's sight line intersection coordinates.

The windshield shape measurement device 8 sets a measurement range in a planar view of the windshield 1 to a range designated by the notified driver area coordinates information, measures a three-dimensional shape of a part of the windshield 1 that overlaps the set measurement range, and transmits the measurement data to the measurement data acquisition unit 61A.

In this way, the measurement data acquisition unit 61A acquires measurement data on a three-dimensional shape of a predetermined first region (a region that overlaps a plane range specified by the driver area coordinates information) including a point (driver's sight line intersection coordinates) that intersect the line of sight of the driver detected by the sight line detection unit 70A in the projectable range 1A in the windshield 1.

The first region where the measurement data is acquired on the basis of the line of sight of the driver is hereinafter referred to as a driver measurement data acquisition region. The driver measurement data acquisition region matches any one of the projection ranges 2a to 2c in the system of FIG. 6.

In a case where the direction of the line of sight of the passenger is notified from the sight line detection unit 70A, the measurement data acquisition unit 61A calculates coordinates (passenger's sight line intersection coordinates) in the projectable range 1A that intersects the line of sight of the passenger on the basis of the passenger table data in the storage unit 30.

Further, the measurement data acquisition unit 61A notifies the windshield shape measurement device 8 of passenger area coordinates information indicated by all coordinates associated with the same information as information of a projection range associated with the passenger's sight line intersection coordinates.

The windshield shape measurement device 8 sets a measurement range in a planar view of the windshield 1 to a range designated by the notified passenger area coordinates information, measures a three-dimensional shape of a part of the windshield 1 that overlaps the set measurement range, and transmits the measurement data to the measurement data acquisition unit 61A.

In this way, the measurement data acquisition unit 61A acquires measurement data on a three-dimensional shape of a predetermined second region (a region that overlaps a plane range designated by the passenger area coordinates information) including a point (passenger's sight line intersection coordinates) that intersect the line of sight of the passenger detected by the sight line detection unit 70A in the projectable range 1A in the windshield 1.

The second region where the measurement data is acquired on the basis of the line of sight of the passenger is referred to as a passenger measurement data acquisition region. The passenger measurement data acquisition region matches any one of the projection ranges 2a to 2c in the system of FIG. 6.

The correction data generation unit 62A generates, on the basis of the measurement data acquired by the measurement data acquisition unit 61A and the direction of the line of sight detected by the sight line detection unit 70A, correction data for correcting distortion of an image in a state where the image based on image light projected onto the region where the measurement data is acquired is viewed in the direction of the line of sight detected by the sight line detection unit 70A, and transmits the generated correction data to the image data correction unit 64A.

Specifically, in a case where the driver measurement data acquisition region and the passenger measurement data acquisition region overlap each other, the correction data generation unit 62A generates, on the basis of the measurement data on the driver measurement data acquisition region acquired by the measurement data acquisition unit 61A and the direction of the line of sight of the driver detected by the sight line detection unit 70A, driver correction data for correcting distortion of an image in a state where the image based on image light projected onto the driver measurement data acquisition region is viewed in the direction of the line of sight of the driver detected by the sight line detection unit 70A.

Further, in a case where the driver measurement data acquisition region and the passenger measurement data acquisition region do not overlap each other, the correction data generation unit 62A generates the driver correction data, and generates, on the basis of the measurement data on the passenger measurement data acquisition region acquired by the measurement data acquisition unit 61A and the direction of the line of sight of the passenger detected by the sight line detection unit 70A, passenger correction data for correcting distortion of an image in a state where the image based on image light projected onto the passenger measurement data acquisition region is viewed in the direction of the line of sight of the passenger detected by the sight line detection unit 70A.

The image data correction unit 64A corrects image data generated by the image data generation unit 63A using the correction data received from the correction data generation unit 62A.

In a case where the driver measurement data acquisition region and the passenger measurement data acquisition region overlap each other, the image data correction unit 64A corrects image data that is a source of image light projected onto the driver measurement data acquisition region using the driver correction data input from the correction data generation unit 62A, and inputs the corrected image data to the driving unit 45 of a unit that projects image light onto the driver measurement data acquisition region (the projection range 2a in the example of FIG. 11) to project image light based on the corrected image data.

In a case where the driver measurement data acquisition region and the passenger measurement data acquisition region do not overlap each other, the image data correction unit 64A corrects image data that is a source of image light projected onto the driver measurement data acquisition region using the driver correction data input from the correction data generation unit 62A, and inputs the corrected image data to the driving unit 45 of a unit that projects image light onto the driver measurement data acquisition region (the projection range 2b in the example of FIG. 10) to project image light based on the corrected image data.

Further, in a case where the driver measurement data acquisition region and the passenger measurement data acquisition region do not overlap each other, the image data correction unit 64A corrects image data that is a source of image light projected onto the passenger measurement data acquisition region using the passenger correction data input from the correction data generation unit 62A, and inputs the corrected image data to the driving unit 45 of a unit that projects image light onto the passenger measurement data acquisition region (the projection range 2c in the example of FIG. 10) to project image light based on the corrected image data.

As described above, in a case where the HUD 10A is used and the line of sight of the driver and the line of sight of the passenger are in the same projection range, image data that is a source of image light projected onto the projection range is corrected so that distortion does not occur on an image when seen from the driver. Thus, the driver can accurately recognize a virtual image, and can reliably perform driving assistance.

Further, according to the HUD 10A, in a case where the line of sight of the driver and the line of sight of the passenger are in different projection ranges, image data that is a source of image light projected onto a projection range where the line of sight of the driver is present is corrected so that distortion of an image does not occur when seen from the driver, and image data that is a source of image light projected onto a projection range where the line of sight of the passenger is present is corrected so that distortion of an image does not occur when seen from the passenger.

In this way, by correcting image data for each occupant, each occupant can observe a virtual image with no distortion.

In the HUD 10A, the first modification example may be applied.

That is, when generating the driver correction data, the correction data generation unit 62A stores the direction of the line of sight of the driver used for the generation of the driver correction data and the driver correction data in the ROM of the storage unit 30 in association.

Further, when generating the passenger correction data, the correction data generation unit 62A stores the direction of the line of sight of the passenger used for the generation of the passenger correction data and the passenger correction data in the ROM of the storage unit 30 in association.

Further, in a case where the direction of a line of sight for which correction data is stored is detected by the sight line detection unit 70A, the stored correction data may be read out and input to the image data correction unit 64A.

In addition, in the HUD 10A, the second modification example may be applied.

That is, the measurement data acquisition unit 61A acquires measurement data on a three-dimensional shape of the projectable range 1A of the windshield 1 when the system is started from the windshield shape measurement device 8, and stores the result in the ROM of the storage unit 30.

Further, the measurement data acquisition unit 61A extracts and acquires necessary data from the measurement data stored in the storage unit 30.

The effects due to the configurations of the above-described systems become more remarkable as the size of the projectable range 1A becomes larger. This is because as the projectable range 1A becomes larger, distortion of an image more easily occurs and the importance of correction of image data becomes higher.

Specifically, in a case where the projectable range 1A in the HUD 10 and the HUD 10A is a range that is wider than a portion that overlaps a range where an overlook angle of a driver of a vehicle calculated from the height of the eyes of the driver in the windshield 1 becomes 30 degrees, remarkable effects are obtained.

FIG. 12 is a diagram showing a relationship between an overlook angle of a driver and a windshield. E shown in FIG. 12 represents a central position of an eye box assumed as a range of the height of the eyes of a driver of an automobile.

A range surrounded by a plane vertical to a gravity direction including the central position E of the eye box and a plane that is inclined with respect to the plane by 30 degrees toward a ground side is a range where an overlook angle of the driver becomes 30 degrees.

In the system shown in FIGS. 1 and 6, in a case where a range that is wider than a range H that overlaps a range where the overlook angle becomes 30 degrees in the windshield 1 is set as the projectable range 1A, remarkable effects can be obtained.

Further, in the third modification example of the HUD 10 and in the HUD 10A, regardless of the size of the projectable range 1A, as a maximum size of an image presented as a virtual image in front of the projectable range 1A becomes larger, distortion of the virtual image more easily occurs.

For this reason, in the third modification example of the HUD 10, in the case of a configuration in which the projection display unit performs projection of image light so that a virtual image having a display size of a minimum of 10 inches or greater can be visually recognized, the effects are particularly great.

Further, in the HUD 10A, in a case where a display size of a virtual image (a minimum size of the virtual image) is 10 inches or greater in a state where all the units 10a to 10c perform projection of image light, the effects are particularly great.

As described above, the following items are disclosed in this specification.

A disclosed projection type display device includes: a projection display unit that includes a light source, a light modulation element that spatially modulates light emitted from the light source on the basis of image data, and a projection unit that projects image light that is spatially modulated by the light modulation element onto a windshield of a vehicle; a sight line detection unit that detects a line of sight of an occupant of the vehicle; a measurement data acquisition unit that acquires measurement data on the shape of a predetermined region including a point that intersects the line of sight detected by the sight line detection unit, in a projectable range where the image light is projectable onto the windshield; a correction data generation unit that generates, on the basis of the measurement data acquired by the measurement data acquisition unit and a direction of the line of sight detected by the sight line detection unit, correction data for correcting distortion of an image in a state where the image based on the image light projected onto the region where the measurement data is acquired is viewed in the direction; and an image data correction unit that corrects the image data using the correction data generated by the correction data generation unit.

The disclosed projection type display device is configured so that the measurement data acquisition unit acquires the measurement data from a measurement device that measures a three-dimensional shape of an object that is provided in the vehicle.

The disclosed projection type display device further includes a measurement data storage unit that stores measurement data on the shape of the projectable range measured by a measurement device that measures a three-dimensional shape of an object that is provided in the vehicle, and is configured so that the measurement data acquisition unit acquires the measurement data from the measurement data storage unit.

The disclosed projection type display device is configured so that the correction data generation unit stores the direction of the line of sight used for generation of the correction data in a storage unit in association with the correction data, and does not perform the generation of the correction data in a case where correction data corresponding to the direction of the line of sight detected by the sight line detection unit is stored in the storage unit, and the image data correction unit corrects the image data using the correction data stored in the storage unit in a case where the correction data corresponding to the direction of the line of sight detected by the sight line detection unit is stored in the storage unit.

The disclosed projection type display device further includes a projection range controller that controls a projection range of the image light in the projectable range on the basis of the line of sight detected by the sight line detection unit.

The disclosed projection type display device is configured so that the projection range controller controls a region including the point that intersects the line of sight detected by the sight line detection unit in the projectable range as the projection range.

The disclosed projection type display device is configured so that the sight line detection unit individually detects lines of sight of a plurality of occupants, and the correction data generation unit generates, in a case where a predetermined first region including a point that intersects a line of sight of a driver among the sight lines of the plurality of occupants detected by the sight line detection unit and a predetermined second region including a point that intersects a sight line of an occupant other than the driver among the sight lines of the plurality of occupants overlap each other, in the projectable range, correction data for correcting distortion of an image based on image light to be projected onto the first region on the basis of measurement data on the shape of the first region acquired by the measurement data acquisition unit and the direction of the line of sight of the driver detected by the sight line detection unit, and generates, in a case where the first region and the second region do not overlap each other, correction data for correcting distortion of an image based on image light to be projected onto the first region and distortion of an image based on image light to be projected onto the second region, on the basis of the measurement data on the shape of each of the first region and the second region acquired by the measurement data acquisition unit and the direction of the line of sight of each occupant detected by the sight line detection unit.

The disclosed projection type display device is configured so that the projectable range is a range that is wider than a portion that overlaps a range where an overlook angle of a driver of the vehicle calculated from the height of the eyes of the driver in the windshield becomes 30 degrees.

The disclosed projection type display device is configured so that the projection display unit performs the projection of the image light so that a virtual image having a display size of a minimum of 10 inches or greater is visually recognizable.

A disclosed projection display method for projecting image light obtained by modulating light emitted from a light source on the basis of image data onto a windshield of a vehicle, includes: a sight line detection step of detecting a line of sight of an occupant of the vehicle; a measurement data acquisition step of acquiring measurement data on the shape of the windshield of a predetermined region including a point that intersects the line of sight detected by the sight line detection step, in a projectable range where the image light is projectable onto the windshield; a correction data generation step of generating, on the basis of the measurement data acquired by the measurement data acquisition step and a direction of the line of sight detected by the sight line detection step, correction data for correcting distortion of an image in a state where the image based on the image light projected onto the region where the measurement data is acquired is viewed in the direction; and an image data correction step of correcting the image data using the correction data generated by the correction data generation step.

The disclosed projection display method is configured so that in the measurement data acquisition step, the measurement data is acquired from a measurement device that measures a three-dimensional shape of an object that is provided in the vehicle.

The disclosed projection display method is configured so that in the measurement data acquisition step, the measurement data is acquired from a measurement data storage unit that stores measurement data on the shape of the projectable range measured by a measurement device that measures a three-dimensional shape of an object that is provided in the vehicle.

The disclosed projection display method is configured so that in the correction data generation step, the direction of the line of sight used for generation of the correction data and the correction data are stored in a storage unit in association, and the generation of the correction data is not performed in a case where correction data corresponding to the direction of the line of sight detected by the sight line detection step is stored in the storage unit, and in the image data correction step, the image data is corrected using the correction data stored in the storage unit in a case where the correction data corresponding to the direction of the line of sight detected in the sight line detection step is stored in the storage unit.

The disclosed projection display method further includes a projection range control step of controlling a projection range of the image light in the projectable range on the basis of the line of sight detected by the sight line detection step.

The disclosed projection display method is configured so that in the projection range control step, a region including the point that intersects the line of sight detected by the sight line detection step in the projectable range is controlled as the projection range.

The disclosed projection display method is configured so that in the sight line detection step, sight lines of a plurality of occupants are individually detected, and in the correction data generation step, in a case where a predetermined first region including a point that intersects a line of sight of a driver among the sight lines of the plurality of occupants detected by the sight line detection step in the projectable range and a predetermined second region including a point that intersects a sight line of an occupant other than the driver among the sight lines of the plurality of occupants overlap each other, in the projectable range, correction data for correcting distortion of an image based on image light to be projected onto the first region is generated, on the basis of measurement data on the shape of the first region acquired by the measurement data acquisition step and the direction of the line of sight of the driver detected by the sight line detection step, and in a case where the first region and the second region do not overlap each other, correction data for correcting distortion of an image based on image light to be projected onto the first region and distortion of an image based on image light to be projected onto the second region is generated, on the basis of the measurement data on the shape of each of the first region and the second region acquired by the measurement data acquisition step and the direction of the line of sight of each occupant detected by the sight line detection step.

The disclosed projection display method is configured so that a range wider than a portion that overlaps a range where an overlook angle of a driver of the vehicle calculated from the height of the eyes of the driver in the windshield becomes 30 degrees is set as the projectable range.

The disclosed projection display method is configured so that projection of the image light is performed so that a virtual image having a display size of a minimum of 10 inches or greater is visually recognizable.

A disclosed non-transitory computer readable recording medium storing a projection display program causes a computer to execute a projection display method for projecting image light obtained by modulating light emitted from a light source on the basis of image data onto a windshield of a vehicle, the method including: a sight line detection step of detecting a line of sight of an occupant of the vehicle; a measurement data acquisition step of acquiring measurement data on the shape of the windshield of a predetermined region including a point that intersects the line of sight detected by the sight line detection step, in a projectable range where the image light is projectable onto the windshield; a correction data generation step of generating, on the basis of the measurement data acquired by the measurement data acquisition step and a direction of the line of sight detected by the sight line detection step, correction data for correcting distortion of an image in a state where the image based on the image light projected onto the region where the measurement data is acquired is viewed in the direction; and an image data correction step of correcting the image data using the correction data generated by the correction data generation step.

The program disclosed in this specification may be provided in a state where the program is recorded on a computer-readable non-transitory recording medium.

The "computer-readable recording medium" includes an optical medium such as a compact disc (CD)-ROM, a magnetic recording medium such as a memory card, or the like. Further, such a program may be provided by downloading through a network.

It should be considered that the currently disclosed embodiments are not limitative but illustrative in all respects. The scope of the invention is not limited to the above description, but is represented by claims of the invention, and is intended to include all modifications in meanings and ranges equivalent to claims of the invention.

INDUSTRIAL APPLICABILITY

The projection type display device of the invention is mounted in an automobile or the like, which provides high comfort and effectiveness.

EXPLANATION OF REFERENCES

1: windshield
1A: projectable range
2: projection range
3: dash board
8: windshield shape measurement device
9: imaging unit
20: driving mechanism
40: light source unit
41r, 41g, 41b: light source
44: light modulation element
50: projection unit
60: system controller
61: measurement data acquisition unit
62: correction data generation unit
63: image data generation unit
64: image data correction unit 65: projection range controller
70: sight line detection unit

What is claimed is:

1. A projection type display device comprising:
a projection display unit that includes a light source, a light modulation element that spatially modulates light emitted from the light source on the basis of image data, and a projection unit that projects image light that is spatially modulated by the light modulation element onto a windshield of a vehicle;
a sight line processor that detects a line of sight of an occupant of the vehicle;
a processor configured to:
acquire measurement data on shape of the windshield of a predetermined region including a point that intersects the line of sight detected by the sight line processor, in a projectable range where the image light is projectable onto the windshield;
generate, on the basis of the measurement data and a direction of the line of sight detected by the sight line processor, correction data for correcting distortion of an image in a state where the image based on the image light projected onto the region where the measurement data is acquired is viewed in the direction; and
correct the image data using the correction data.

2. The projection type display device according to claim 1,
wherein the processor acquires the measurement data from a measurement device that measures a three-dimensional shape of an object that is provided in the vehicle.

3. The projection type display device according to claim 2,
wherein the processor stores the direction of the line of sight used for generation of the correction data in a storage unit in association with the correction data, and does not perform the generation of the correction data in a case where correction data corresponding to the direction of the line of sight detected by the sight line processor is stored in the storage unit, and
the processor corrects the image data using the correction data stored in the storage unit in a case where the correction data corresponding to the direction of the line of sight detected by the sight line processor is stored in the storage unit.

4. The projection type display device according to claim 1, further comprising:
a memory that stores measurement data on the shape of the projectable range measured by a measurement device that measures a three-dimensional shape of an object that is provided in the vehicle,
wherein the processor acquires the measurement data from the memory.

5. The projection type display device according to claim 1,
wherein the processor stores the direction of the line of sight used for generation of the correction data in a storage unit in association with the correction data, and does not perform the generation of the correction data in a case where correction data corresponding to the direction of the line of sight detected by the sight line processor is stored in the storage unit, and
the processor corrects the image data using the correction data stored in the storage unit in a case where the correction data corresponding to the direction of the line of sight detected by the sight line processor is stored in the storage unit.

6. The projection type display device according to claim 1, the processor further configured to:
control a projection range of the image light in the projectable range on the basis of the line of sight detected by the sight line processor.

7. The projection type display device according to claim 6,
wherein the processor controls a region including the point that intersects the line of sight detected by the sight line processor in the projectable range as the projection range.

8. The projection type display device according to claim 1,
wherein the sight line processor individually detects lines of sight of a plurality of occupants, and
the processor generates, in a case where a predetermined first region including a point that intersects a line of sight of a driver among the sight lines of the plurality of occupants detected by the sight line processor and a predetermined second region including a point that intersects a sight line of an occupant other than the driver among the sight lines of the plurality of occupants overlap each other, in the projectable range, correction data for correcting distortion of an image based on image light to be projected onto the first region on the basis of measurement data on the shape of the first region acquired by the processor and the direction of the line of sight of the driver detected by the sight line processor, and generates, in a case where the first region and the second region do not overlap each other, correction data for correcting distortion of an image based on image light to be projected onto the first region and distortion of an image based on image light to be projected onto the second region, on the basis of the measurement data on the shape of each of the first region and the second region acquired by the processor and the direction of the line of sight of each occupant detected by the sight line processor.

9. The projection type display device according to claim 1,
wherein the projectable range is a range that is wider than a portion that overlaps a range where an overlook angle of a driver of the vehicle calculated from the height of the eyes of the driver in the windshield becomes 30 degrees.

10. The projection type display device according to claim 1,
wherein the projection display unit performs projection of the image light so that a virtual image having a display size of a minimum of 10 inches or greater is visually recognizable.

11. A projection display method for projecting image light obtained by modulating light emitted from a light source on the basis of image data onto a windshield of a vehicle, the method comprising:
detecting a line of sight of an occupant of the vehicle;
acquiring measurement data on shape of the windshield of a predetermined region including a point that intersects the line of sight, in a projectable range where the image light is projectable onto the windshield;
generating, on the basis of the measurement data and a direction of the line of sight, correction data for correcting distortion of an image in a state where the image based on the image light projected onto the region where the measurement data is acquired is viewed in the direction; and
correcting the image data using the correction data.

12. The projection display method according to claim 11, wherein the measurement data is acquired from a measurement device that measures a three-dimensional shape of an object that is provided in the vehicle.

13. The projection display method according to claim 11, wherein the measurement data is acquired from a memory that stores measurement data on the shape of the projectable range measured by a measurement device that measures a three-dimensional shape of an object that is provided in the vehicle.

14. The projection display method according to claim 11, wherein the direction of the line of sight used for generation of the correction data and the correction data are stored in a storage unit in association, and the generation of the correction data is not performed in a case where correction data corresponding to the direction of the line of sight is stored in the storage unit, and the image data is corrected using the correction data stored in the storage unit in a case where the correction data corresponding to the direction of the line of sight is stored in the storage unit.

15. The projection display method according to claim 11, further comprising:

a projection range control step of controlling a projection range of the image light in the projectable range on the basis of the line of sight.

16. The projection display method according to claim 15, wherein in the projection range control step, a region including the point that intersects the line of sight in the projectable range is controlled as the projection range.

17. The projection display method according to claim 11, wherein sight lines of a plurality of occupants are individually detected, and in a case where a predetermined first region including a point that intersects a line of sight of a driver among the sight lines of the plurality of occupants and a predetermined second region including a point that intersects a sight line of an occupant other than the driver among the sight lines of the plurality of occupants overlap each other, in the projectable range, correction data for correcting distortion of an image based on image light to be projected onto the first region is generated, on the basis of measurement data on the shape of the first region and the direction of the line of sight of the driver, and in a case where the first region and the second region do not overlap each other, correction data for correcting distortion of an image based on image light to be projected onto the first region and distortion of an image based on image light to be projected onto the second region is generated, on the basis of the measurement data on the shape of each of the first region and the second region and the direction of the line of sight of each occupant.

18. The projection display method according to claim 11, wherein a range wider than a portion that overlaps a range where an overlook angle of a driver of the vehicle calculated from the height of the eyes of the driver in the windshield becomes 30 degrees is set as the projectable range.

19. The projection display method according to claim 11, wherein projection of the image light is performed so that a virtual image having a display size of a minimum of 10 inches or greater is visually recognizable.

20. A non-transitory computer readable recording medium storing a projection display program that causes a computer to execute a projection display method for projecting image light obtained by modulating light emitted from a light source on the basis of image data onto a windshield of a vehicle, the method comprising:

detecting a line of sight of an occupant of the vehicle;

acquiring measurement data on shape of the windshield of a predetermined region including a point that intersects the line of sight, in a projectable range where the image light is projectable onto the windshield;

generating, on the basis of the measurement data and a direction of the line of sight, correction data for correcting distortion of an image in a state where the image based on the image light projected onto the region where the measurement data is acquired is viewed in the direction; and correcting the image data using the correction data.

* * * * *